UNITED STATES PATENT OFFICE.

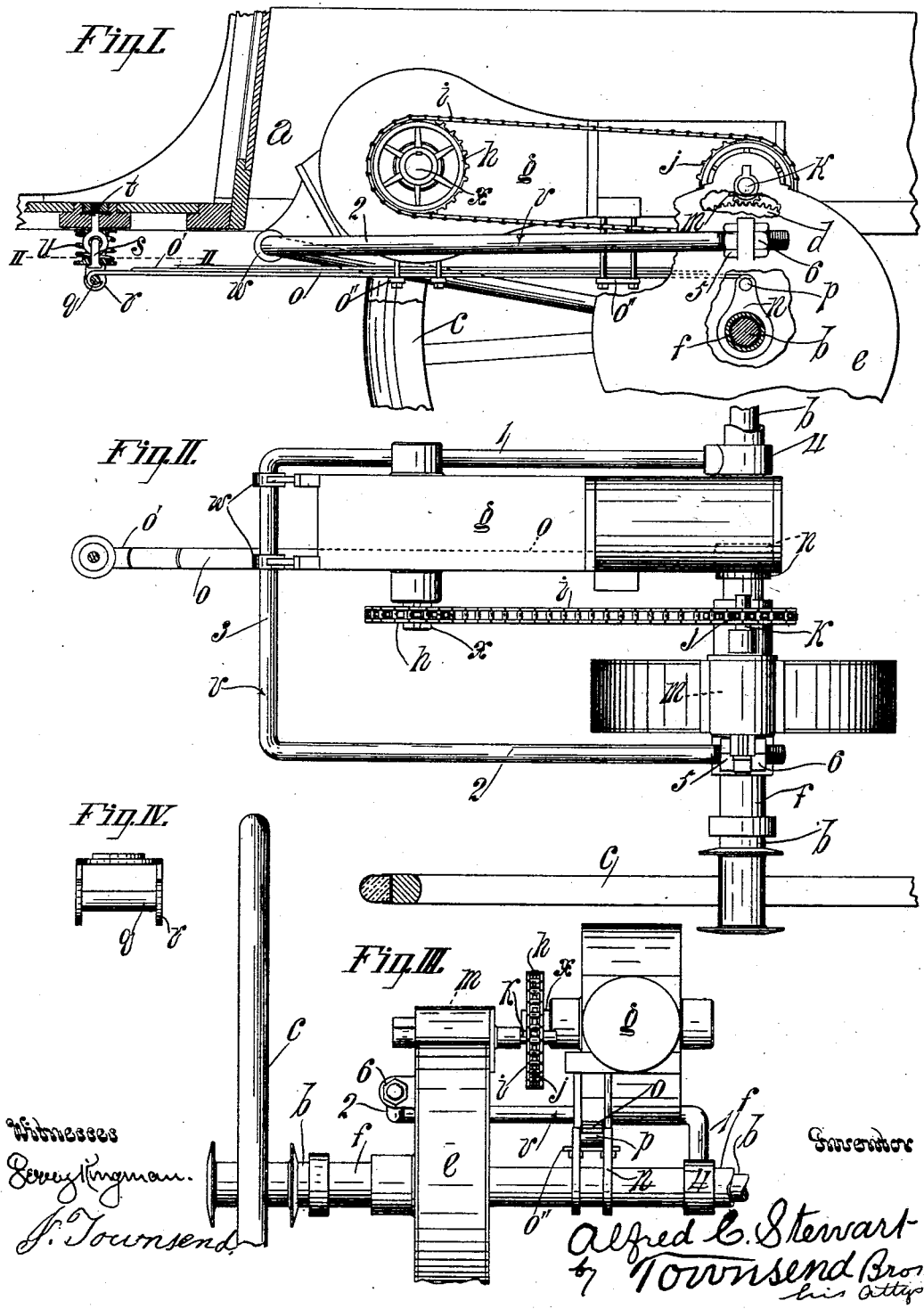

ALFRED C. STEWART, OF SANTA PAULA, CALIFORNIA.

MOTOR-VEHICLE.

SPECIFICATION forming part of Letters Patent No. 684,322, dated October 8, 1901.

Application filed July 11, 1900. Serial No. 23,244. (No model.)

*To all whom it may concern:*

Be it known that I, ALFRED C. STEWART, a citizen of the United States, residing at Santa Paula, in the county of Ventura and State of California, have invented new and useful Improvements in Motor-Vehicles, of which the following is a specification.

The object of this invention is to provide a means of carrying the motor to free it from all vibration of the road and at the same time make it impossible to impart any vibration to the carriage-body.

My invention employs in a motor-vehicle the combination of a resilient engine-support carried by the vehicle, an engine carried by said engine-support and operatively connected with the driving-shaft of the vehicle to drive the same, and an alinement-maintaining connection journaled upon the axle and pivotally connected with the engine.

The accompanying drawings illustrate my invention.

Figure I is a fragmental view of a motor-vehicle embodying my invention. Fig. II is a plan of the same, omitting the body of the vehicle, the same being cut away on line II II, Fig. I. Fig. III is an elevation from the right of Figs. I and II. Fig. IV is an elevation of the spring-support viewed from the left of Fig. I.

$a$ indicates the wheel-carried body of the motor-vehicle.

$b$ indicates the wheel-driving axle.

$c$ indicates the traction-wheel of the vehicle, which is driven by the driving-axle $b$.

$d$ indicates a driving-wheel on the driving-axle for rotating the same.

$e$ indicates a case journaled on the axle through the medium of a sleeve $f$, through which the axle extends and in which it rotates.

$g$ indicates an engine operatively connected with said driving-wheel $d$ to rotate the same. Said engine may be connected with said wheel in any suitable manner. For convenience of illustration I have shown it connected by means of a sprocket-wheel $h$, sprocket-chain $i$, driven thereby, and a driving sprocket-wheel $j$, which drives a shaft $k$, which drives a pinion $m$, which meshes with the driving-wheel $d$, which is a cog-wheel.

It is to be understood that any suitable means of operatively connecting the engine $g$ with the driving-shaft $d$ to drive the same may be employed without departing from the spirit of my invention.

$n$ indicates a vibrating bracket or arm journaled on the driving-shaft through the medium of the stationary sleeve $f$, upon which the arm or bracket $n$ is loosely mounted to vibrate.

$o$ indicates a resilient engine-support connected at one end with the vehicle-body $a$ and pivotally connected at the other end with the vibrating bracket.

$p$ indicates the pivot for connecting the resilient engine-support $o$ with the bracket-arm $n$. $q$ indicates a pivot which supports the other end of the engine-support $o$. Said other end, which is thus supported, is carried by a swivel-link composed of the members $r$, $s$, and $t$, which allows a free swinging movement of the end $o'$ of the engine-support $o$. $u$ indicates a compression-spring to take up the lost movement of the link thus formed.

The resilient engine-support $o$ shown in the drawings consists in a leaf-spring; but it is to be understood that the resilient engine-support may be variously constructed and supported without departing from the spirit of my invention, the object of this support being to resiliently uphold the engine.

$o''$ indicates suitable means for securing the engine to the engine-support.

$v$ indicates a connecting-rod journaled to the driving-axle $b$ and pivotally connected with the engine.

$w$ indicates the point at which the connecting-rod $v$ is pivoted to the engine. This point is preferably located near the lower part of the engine and at a considerable distance from the driving-axle $b$. The connecting-rod $v$, which is shown in the drawings, is provided with two limbs 1 2 and a cross-bar 3, which connects them and pivots them to the engine. The limb 1 is journaled by an eye 4 on the sleeve $f$, and the arm 2 is journaled to the sleeve $f$ through the medium of the gear-case $e$, which contains the axle driving-wheel $d$ and the pinion $m$, which drives the same.

In case a sprocket-chain is used, as shown in the drawings, it is desirable that some means be provided for adjusting the tension of the chain. For this purpose the arm 2 is adjustably fixed by set-nuts 5 6 upon the gear-case *e* at a point above the sleeve, and the arm 1 is fastened to the eye 4, which is journaled on the sleeve. By loosening nut 6 and tightening 5 the case will be slightly rotated to tighten the chain. A reverse operation will loosen the chain.

In practical use the engine is free to move vertically by reason of the resilient support; but motion in all other directions is prevented by the connection *v*, which at all times holds the engine-shaft *x* parallel with and on a plane with the driving-axle of the vehicle, at the same time keeping the distance between said shaft and axle constant. The engine is thus freed from all vibration of the running-gear, but at the same time cannot impart its own vibration to the carriage-body, as would be the case if it were mounted directly thereon.

What I claim, and desire to secure by Letters Patent of the United States, is—

1. A motor-vehicle comprising a wheel-driving axle; a driving-wheel on the driving-axle for rotating the same; an engine operatively connected with said driving-wheel to rotate the same; a vibrating bracket journaled on the driving-shaft; a resilient engine-support pivotally connected at one end with the vibrating bracket and at the other end with a suitable support; means securing the engine to the engine-support; and a rigid connection journaled to the driving-shaft and pivotally connected with the engine.

2. A motor-vehicle comprising a wheel-carried body; a wheel-driving axle; a driving-wheel on the driving-axle for rotating the same; an engine operatively connected with said driving-wheel to rotate the same; a vibrating bracket-arm journaled on the driving-shaft; a resilient engine-support connected at one end with the vehicle-body and pivotally connected at the other end with the vibrating bracket; means securing the engine to the engine-support; and a connecting-rod journaled to the driving-axle and pivotally connected with the engine.

3. A motor-vehicle comprising a wheel-carried body; a wheel-driving axle; a driving-wheel on the driving-axle for rotating the same; an engine operatively connected with said driving-wheel to rotate the same; a vibrating bracket journaled on the driving-shaft; a resilient engine-support pivotally connected at one end with the vibrating bracket; a swinging connection connecting the other end of the resilient engine-support with the wheel-carried body; and a connecting-rod journaled on the driving-shaft and pivotally connected with the engine.

4. A motor-vehicle comprising a wheel-carried body; a wheel-driving axle; a driving-wheel on the driving-axle for rotating the same; a case for said driving-wheel journaled on the axle to allow the same to rotate therewith; an engine operatively connected with said driving-wheel to rotate the same; a vibrating bracket-arm journaled on the driving-shaft; a resilient engine-support connected at one end with the vehicle-body and pivotally connected at the other end with the vibrating bracket; means securing the engine to the engine-support; and a connecting-rod adjustably connected with said case and pivotally connected with the engine, substantially as set forth.

In testimony whereof I have signed my name to this specification, in the presence of two subscribing witnesses, at Los Angeles, California, this 5th day of June, 1900.

ALFRED C. STEWART.

Witnesses:
JAMES R. TOWNSEND,
JULIA TOWNSEND.